United States Patent
Suga et al.

(10) Patent No.: US 8,440,322 B2
(45) Date of Patent: May 14, 2013

(54) PLAIN BEARING

(75) Inventors: Shigeyuki Suga, Aichi (JP); Hitoshi Wada, Aichi (JP); Takashi Tomikawa, Aichi (JP)

(73) Assignee: Taiho Kogyo Co., Ltd., Toyota-shi (JP)

( * ) Notice: Subject to any disclaimer, the term of this patent is extended or adjusted under 35 U.S.C. 154(b) by 659 days.

(21) Appl. No.: 12/530,356

(22) PCT Filed: Mar. 12, 2008

(86) PCT No.: PCT/JP2008/054524
§ 371 (c)(1),
(2), (4) Date: Oct. 7, 2009

(87) PCT Pub. No.: WO2008/111617
PCT Pub. Date: Sep. 18, 2008

(65) Prior Publication Data
US 2010/0129011 A1 May 27, 2010

(30) Foreign Application Priority Data
Mar. 12, 2007 (JP) .................. 2007-062592

(51) Int. Cl.
*F16C 33/12* (2006.01)
*C22C 9/02* (2006.01)

(52) U.S. Cl.
USPC ............ 428/647; 428/612; 384/625; 384/912

(58) Field of Classification Search ........................ None
See application file for complete search history.

(56) References Cited

U.S. PATENT DOCUMENTS

| 4,441,118 | A | | 4/1984 | Fister et al. |
| 5,286,444 | A | * | 2/1994 | Tomikawa et al. ............ 420/491 |
| 5,334,460 | A | | 8/1994 | Tanaka et al. |
| 5,489,487 | A | | 2/1996 | Tanaka et al. |
| 5,665,480 | A | * | 9/1997 | Tanaka et al. ................. 428/645 |
| 5,911,513 | A | | 6/1999 | Tsuji et al. |

(Continued)

FOREIGN PATENT DOCUMENTS

| DE | 102005023306 A1 | 11/2006 |
| GB | 2285060 A | 6/1995 |

(Continued)

OTHER PUBLICATIONS

Extended European Search Report dated Jul. 28, 2011 for European Application No. 08721940.8.

(Continued)

*Primary Examiner* — John J Zimmerman
(74) *Attorney, Agent, or Firm* — Birch, Stewart, Kolasch & Birch, LLP

(57) ABSTRACT

The copper alloy (lining) prevails in an overwhelmingly large amount in a plain-bearing layer structure. Cu of the plain bearing copper-alloy diffuses into the Sn-based overlay diffuses into the Sn-based overlay and detrimentally impairs the performance of the overlay. The present invention takes a measure against this problem. An Sn-based overlay having a thickness of 3 to 19 μm is deposited by electro-plating without an intermediate layer for diffusion prevention on a plain-bearing layer, which contains Sn and Ni in a total amount of more than 4 mass % to 20 mass % (the minimum amount of Sn is 4 mass %) and has a hardness of Hv 150 or less.

10 Claims, 5 Drawing Sheets

U.S. PATENT DOCUMENTS

| | | | |
|---|---|---|---|
| 6,025,081 | A | 2/2000 | Ohshiro et al. |
| 6,077,815 | A | 6/2000 | Grunthaler et al. |
| 6,194,087 | B1 | 2/2001 | Huhn et al. |
| 6,254,701 | B1 | 7/2001 | Oshiro et al. |
| 6,357,683 | B1 | 3/2002 | Patzelt et al. |
| 6,357,919 | B1 | 3/2002 | Kawachi et al. |
| 6,492,039 | B2 | 12/2002 | Huhn et al. |
| 6,537,683 | B1 | 3/2003 | Staschko et al. |
| 2003/0064239 | A1 | 4/2003 | Saitou et al. |

FOREIGN PATENT DOCUMENTS

| | | | |
|---|---|---|---|
| GB | 2 375 801 A | 11/2002 | |
| JP | 59-145553 A | 8/1984 | |
| JP | 5-239696 A | 9/1993 | |
| JP | 7-179964 A | 7/1995 | |
| JP | 9-125176 A | 5/1997 | |
| JP | 10-205539 A | 8/1998 | |
| JP | 11-510859 A | 9/1999 | |
| JP | 2000-64085 A | 2/2000 | |
| JP | 2000-345258 A | 12/2000 | |
| JP | 2001-153141 A | 6/2001 | |
| JP | 2001-247995 A | 9/2001 | |
| JP | 2002-530530 A | 9/2002 | |
| JP | 2002-310158 A | 10/2002 | |
| JP | 3397334 B2 | 2/2003 | |
| JP | 3560723 B2 | 6/2004 | |
| JP | 3657742 B2 | 3/2005 | |
| JP | 2006-153193 A | 6/2006 | |
| WO | WO 2006/120023 | * | 11/2006 |
| WO | WO 2006/120025 | * | 11/2006 |
| WO | WO-2008/111617 A1 | 9/2008 | |

OTHER PUBLICATIONS

Korean Office Action dated Apr. 25, 2012 issued in corresponding Korean patent application No. 10-2009-7019001(English translation attached).

* cited by examiner

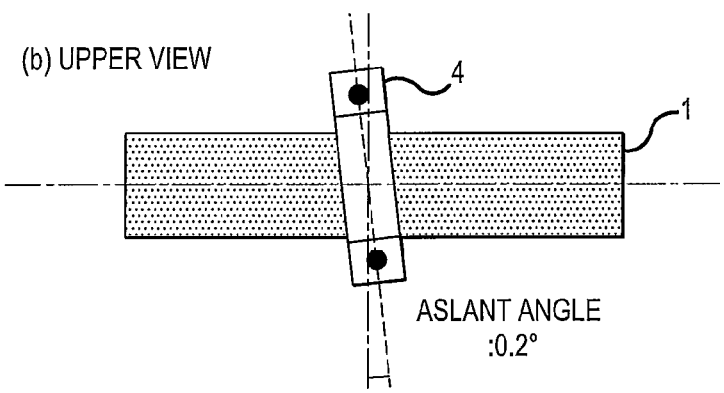
FIG.7
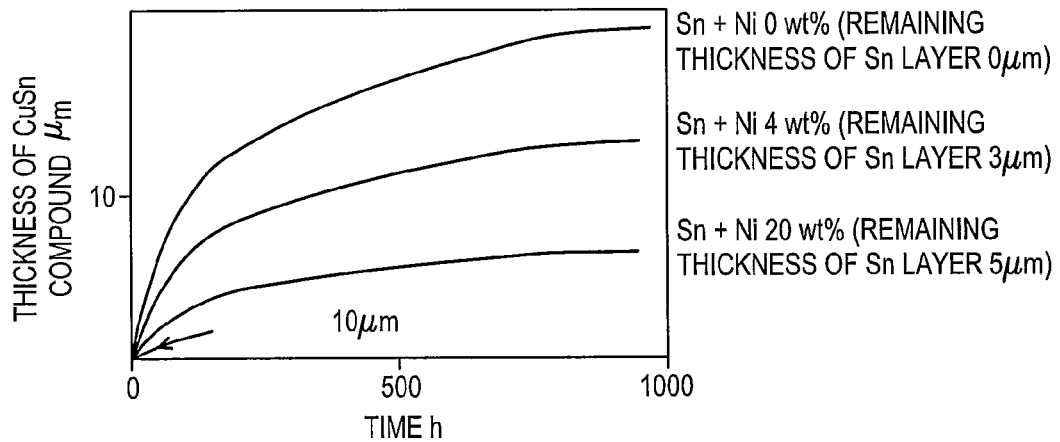
FIG.8
FIG.9

PLAIN BEARING

TECHNICAL FIELD

The present invention relates to a plain bearing. More particularly, an Sn-based overlay is applied on a copper-based alloy layer of the plain bearing, in order to satisfy compatibility requirements. The present invention relates to a technique for preventing performance deterioration of the Sn-based overlay due to diffusion of Cu from the copper-based alloy layer into the same.

BACKGROUND TECHNIQUE

Heretofore, copper alloys with soft alloying additives such as Pb and Bi (referred to as "lining") have been used for the plain bearing described above. Metallic Pb or Sn or their alloys have been used for the overlay. Cu of the copper alloy diffuses into the overlay and forms Cu—Sn based intermetallic compounds such as $Cu_6Sn_5$, $Cu_3Sn$, and the like, which in turn deteriorate fatigue resistance and softness of the overlay.

Therefore, an intermediate metallic layer, such as an Ni intermediate layer referred to as an Ni barrier, is usually interposed between the lining and the overlay.

Patent Documents 1 through 12 relating to plain bearings are listed below in filing date sequence. Patent Document No. 13 relates not to a plain bearing but to an Sn alloy/Cu alloy lamination structure, but also serves as a prior art document.

Patent Document 1, Japanese Patent No. 3397334 (Japanese Patent Application No. Hei3-302668), relates to a plain bearing which comprises a plain-bearing layer consisting of kelmet or aluminum alloy and an Sn-based overlay, which is applied on the plain-bearing alloy-layer. An intermediate layer made of Ni or the like for preventing diffusion is optionally interposed between the plain-bearing layer and the Sn-based overlay. Such layer structure is usual in the plain bearing. This patent document describes that organic carbon contained in the overlay in an amount of 0.02 to 0.5% by weight prevents diffusion of Sn into the plain-bearing layer. As a result, seizure resistance is improved.

In Patent Document 2, Japanese Unexamined Patent Publication (kokai) No. Hei5-239696 (Japanese Patent Application No. Hei 4-239696), an Sn-based overlay with hard matter additives is bonded on an underlying layer with higher adhesive strength. Granular hard particles are dispersed in an upper layer of the proposed Sn-based overlay. The granular hard particles are dispersed in an amount of 5 to 50% by volume and have an average particle diameter of 0.1 to 5 µm, with the largest diameter being smaller than the thickness of an oil film. A lower layer consists of Sn (alloy) free of dispersed hard matter. Copper alloy of the plain bearing is bronze or lead bronze containing In, Tl, P, Ag, Ni, Al or the like as an optional element(s) in a total amount of 5% or less.

In a Cu matrix of a plain-bearing copper-alloy according to Patent Document 3: Japanese Patent No. 3560723 (Japanese Patent Application No. Hei 8-57874), Ag, Sn, Sb, In, Mn, Fe, Bi, Zn, Ni, and/or Cr (except for combination of only Ag and Sn) is dissolved. Particularly, Ag is super-saturation dissolved under non-equilibrium. A minority phase of these elements is essentially not formed. Sn content ranges from 1 to 10 wt %, and Ni content ranges from 5 to 50 wt %. In this patent document, since the specified solute element(s), particularly Ag, concentrates on the surface of copper alloy, a material having improved seizure resistance is formed on this surface. Therefore, Sn, which is usually contained in the copper alloy, is not indispensable. In addition, an Ni intermediate layer interposed between the overlay and plain bearing for preventing diffusion of Sn is also not indispensable. An overlay based on Sn, Pb, or resin is not indispensable but may be used.

A plain bearing of Patent document 4, Japanese Unexamined Patent Publication (kokai) No. 10-205539 (Japanese Patent Application No. 10-205339) consists of a backing metal, a bearing-alloy layer formed on the backing metal and consisting of copper alloy, and an Sn or Al-based overlay. An intermediate layer consisting of Cu—Zn alloy with 20-50% by weight of Zn is interposed between the bearing-alloy layer and the overlay, so as to improve seizure resistance and fatigue resistance.

A plain-bearing alloy proposed in Patent document 5: Japanese Patent No. 3657742 (Japanese Patent Application No. Hei9-152160) contains 1% or more of at least one of Ag and Sn as an essential component and contains one or more of Sb, In, Al, Mg, or Cd as an optional element(s). The essential and optional element(s) are dissolved as a solute(s). During sliding, a compound of hexagonal crystal is formed in the upper part of the copper alloy or on the surface of a plain bearing.

Therefore, an Ni intermediate layer between the overlay and plain bearing for preventing diffusion of Sn is not indispensable for preventing diffusion of Sn. An overlay based on Sn, Pb, or resin is not indispensable but may be used. When an Ni intermediate layer for preventing diffusion is omitted as proposed by this patent document, cost reduction is attained.

Patent Document 6: Japanese Domestic Publication (PCT) No. Hei 11-510859 (Japanese Patent application Hei 10-500079) relates to a production method of a sliding member. It discloses dispersion of particles of carbide or the like in an electrolytically deposited material, such as Sn—Cu—Ni. Since the particles suppress diffusion of Sn, the so called-Ni barrier is unnecessary, and cost reduction can be attained.

A plain-bearing layer of a plain bearing proposed in Patent Document 7: Japanese Unexamined Patent Publication (kokai) 2000-64085 (Japanese Patent Application No. 10-345952) consists of copper alloy containing 50 to 95% by weight Cu, or aluminum alloy containing 60 to 95% by weight Al. A diffusion-suppressing layer consisting of Ni or the like is provided. An overlay is a plating layer of a lead-free alloy containing 8-30% by weight Cu, 60-97% by weight Sn, and 0.5-10% by weight Co. The overlay is characterized in that it does not embrittle at up to relatively high temperatures.

An overlay of a plain bearing proposed in Patent Document 8: Japanese Unexamined Patent Publication (kokai) No. 2000-345258 (Japanese Patent Application No. 11-163247) is an Sn alloy containing 2 to 10% by weight Ag.

An overlay of a plain bearing proposed in Patent Document 9, Japanese Domestic Publication (PCT) No. 2002-530530 (Japanese Patent Application No. 2000-582622) is an electroplating layer, in which hard particles and soft particles are dispersed. Hardness increases in a direction toward a plain-bearing layer.

An overlay of a plain bearing proposed in Patent Document 10: Japanese Unexamined Patent Publication (kokai) 2001-247995 (Japanese Patent Application No. 2000-397944) is an Sn alloy, in the matrix of which Sn—Cu particles are dispersed. Wear resistance is improved over that of a conventional Pb-based overlay.

An Sn-based overlay of a plain bearing proposed in Patent Document 11: Japanese Unexamined Patent Publication (kokai) No. 2002-310158 (Japanese Patent Application No. 2001-109853) consists of a lower layer 4 and an upper layer 5 having different Cu contents. The lower layer 4 contains a greater amount of Cu, as high as 5 to 20% by weight, and is 1 to 3 µm in thickness. Cu of the Sn-based overlay may diffuse to an intermediate layer for preventing diffusion. Diffusion initiates at the lower layer 4. Therefore, Cu in the upper layer 5, which is in contact with opposite material, decreases by a suppressed amount. Decrease of Cu in a surface part of the overlay layer can be prevented for a long period of time, even in the intermediate layer for preventing diffusion is not thick.

Patent Document 12: Japanese Unexamined Patent Publication (kokai) No. 2006-153193 (Japanese Patent Application No. 2004-34398) proposes subjecting a copper-alloy lining and an Sn-based overlay to heat treatment. A Cu—Sn compound layer having a large amount of minute surface unevenness is formed by heat treatment in the Sn-based overlay. Both compatibility and wear resistance of the Sn-based overlay are maintained at enhanced levels, when the Sn plating layer is embedded in the minute convexities.

Patent Document 13: Japanese Unexamined Patent Publication (kokai) No. 59-145553 (Japanese Patent Application No. 59-4655) relates to a copper-alloy structure used for brazing or the like. A copper-alloy bottom layer of the structure contains Ni in an amount of approximately 19% to approximately 28% as an essential element and contains Zn, Mn, Fe, Cr, Mg, P, and/or Mg as an optional element(s). The structure includes an Sn-based coating layer. The document discloses that Ni of the bottom layer suppresses formation of Cu—Sn based intermetallic compound between the bottom layer and the coating layer. As a result, brazing exposure life is improved.

Patent Document 1: Japanese Patent No. 3397334
Patent Document 2: Japanese Unexamined Patent Publication (kokai) Hei 5-239696
Patent Document 3: Japanese Patent No. 3560723
Patent Document 4: Japanese Unexamined Patent Publication (kokai) Hei 10-205539
Patent Document 5: Japanese Patent No. 3657742
Patent Document 6: Japanese Domestic Patent Publication (PCT) Hei 11-510850
Patent Document 7: Japanese Unexamined Patent Publication (kokai) 2000-64085
Patent Document 8: Japanese Unexamined Patent Publication (kokai) 2000-345258
Patent Document 9: Japanese Domestic Patent Publication (PCT) 2002-530530
Patent Document 10: Japanese Unexamined Patent Publication (kokai) 2001-247995
Patent Document 11: Japanese Unexamined Patent Publication (kokai) 2002-310158
Patent Document 12: Japanese Unexamined Patent Publication (kokai) 2006-153193
Patent Document 13: Japanese Unexamined Publication (kokai) Sho59-145553

DISCLOSURE OF THE INVENTION

Problems to be Solved by the Invention

The above listed prior art are largely classified into the following technical groups.
(a) Methods for preventing diffusion of Sn in the overlay (Patent Documents 1, 6)
(b) Material having improved sliding properties is generated on the sliding surface of a plain bearing during sliding. An Ni barrier or the like for suppressing the diffusion of components of a plain bearing is therefore unnecessary (Patent Documents 3, 5)
(c) No particular relationship with Sn diffusion (Patent Documents 2, 7, 8, 9, 10)
(d) An intermediate layer for preventing diffusion (Patent Documents 4, 11)
(e) Copper may diffuse from a lining to an Sn-based overlay. Such diffusion is utilized (Patent Document 12)
(f) Cu of an alloy substrate may diffuse into an Sn coating layer. Such diffusion is suppressed (Patent Document 13)

The copper-alloy (lining) prevails in an overwhelmingly large amount in a plain-bearing layer structure. Cu of the plain bearing copper-alloy diffuses into the Sn-based overlay and detrimentally impairs the performances of the overlay. The present invention improves the lining and takes a measure against the problem. Countermeasures proposed in Patent Documents 1 through 12 related to a plain bearing do not pertain to the technique of the present invention.

The technique of the present invention belongs to Group (f). Patent Document 13 does not pertain to a plain bearing. However, if an Sn-based overlay is applied on the layer of Patent Document 13, a plain bearing is provided. The copper-alloy described in Patent Document 13 contains Sn as an essential element, and Zn, Mn, Fe, Cr, Mg, P, and/or Mg as an optional element(s), but is free of Ni. It was discovered that such alloy composition cannot satisfactorily prevent diffusion of Cu.

The plain bearing described in Patent Document 3, belonging to Group (b), contains 1 to 10 wt % Sn and 5 to 50 wt % Ni, with the balance consisting of Cu, and is free of an Ni barrier, and comprises an Sn-based overlay. According to the description of this patent document, Ni and Sn are dissolved in the material of plain-bearing alloy (lining) as solutes. A minority phase consisting of or comprising Ni and Sn is not formed. An Ni or Sn concentrated layer is formed on the material of a plain-bearing alloy. Although an Sn-based overlay is generally described, the overlay tested in the examples is based on Pb—Sn—Cu. The present inventors carried out experiments on Sn-based overlay and confirmed the following. The above-described components do not concentrate on the lining surface, but rather Cu of the lining preferentially diffuses into the Sn-based overlay, thereby reducing a remaining thickness of Sn in the overlay. In this case, seizure is likely to occur at a local-contacting position of the overlay.

In a plain bearing, an Sn-based overlay is deposited on the copper-based alloy layer to provide necessary compatibility. Cu of the copper-based lining may diffuse into the Sn-based overlay. In view of the level of prior art described hereinabove, all object of the present invention is to provide a technique whereby the diffusion of Cu described above is prevented and hence performance deterioration due to such diffusion is prevented. More specifically, the present inventors further investigated a plain bearing described in Patent Document 3. That is, an Sn-based overlay is deposited directly without an intermediary Ni barrier on the bearing layer (lining). The bearing layer consists of Cu alloy containing 1 to 10 wt % Sn and 5 to 50 wt % Ni, the balance consisting of Cu. The plain bearing was investigated in terms of performance, structure, and the like.

Means for Solving the Problem

A plain bearing according to the present invention is characterized in that an Sn-based overlay having a thickness of 3 to 19 μm is deposited by electro-plating without an intermediate layer for diffusion prevention on a plain-bearing layer, which contains more than 4 mass % to 20 mass % in total of Sn and Ni (the minimum amount of Sn is 4 mass %) and has a hardness of Hv 150 or less. One or more of Zn, Ag, Al, and In can be included the copper alloy in a total amount of 5 mass % or less. These additive elements contribute to seizure resistance.

The present invention is described hereinbelow in detail.

The plain-bearing alloy according to the present invention contains Sn and Ni. Sn and Ni lower activity of Cu and hence suppress diffusion of Cu into the Sn-based overlay. Sn and Ni strengthen copper alloy and enhance its fatigue resistance. Sn and Ni also solution-harden the copper alloy. When the total content of Sn and Ni is less than 4 mass %, they are effective only to an unsatisfactory level. On the other hand, when the total content exceeds 20 mass %, the copper alloy is excessively solution hardened, thereby impairing seizure resistance at offset contact. Total content is preferably 4 to 12 mass %, and more preferably 5 to 8 mass %. Sn and Ni are essentially equally effective for the points described above. However, Sn must be present in an amount of at least 4 mass %, in view of decreasing Cu activity and enhancing fatigue resistance.

Cu matrix with Ni and Sn solutes is a main constituent structure of the copper alloy described above, while Cu—Sn based intermetallic compounds form a minority phase. The Cu—Sn based intermetallic compound has a hardness exceeding Hv 150. This compound is finely divided minority phase and is an auxiliary constituent structure. Therefore, the obtained average hardness measured by a Vickers hardness tester on the representative portions of a copper alloy is Hv150 or less. Patent Document 3 describes that Ni—Sn concentrates, resulting in an Ni—Sn based compound. Hardness of copper alloy, in which Ni—Sn concentrates and the Ni—Sn based compound is formed, exceeds Hv 150. However, neither Ni nor Sn concentrate at the interface between the lining according to the present invention and an overlay. A copper-alloy rolled material or sintered material having the above-mentioned hardness is produced by a usual method under usual conditions, where neither Ni nor Sn is supersaturation dissolved in the copper alloy.

An Sn alloy capable of being used for the Sn-based overlay according to the present invention is pure Sn (hardness of Hv 8-12) or Sn alloy (hardness of Hv 10-20) containing 5 mass % or less of Ag, Cu, and/or Sb. An overlay layer can be formed by a neutral Sn-plating bath, an acidic Sn plating bath, or an alkali plating bath.

The present invention is explained in detail with reference to the drawings.

BRIEF DESCRIPTION OF DRAWINGS

FIG. 7 A plan view of FIG. 6.

FIG. 8 A chart showing several properties of plain bearings with different Sn+Ni contents.

FIG. 9 A drawing to illustrate growth of Cu—Sn intermetallic compound during engine operation.

An offset seizure load and non-fatigue area percentage of an overlay were measured by the methods described hereinafter. FIG. 1 illustrates a relationship between the offset seizure load or non-fatigue area percentage and the thickness of an Sn-based overlay. The non-fatigue area percentage was judged by (total area−fatigue area)/total area (%). The non-fatigue area was judged with a magnifying lens. Based on FIG. 1, thickness of an Sn-based overlay was determined to be 3 to 19 μm. Thickness of the overlay is preferably 4 to 13 μm, more preferably 4 to 10 μm.

The plain bearing is described hereinabove on a premise that an Sn plating is in a condition immediately after deposition, or a premise that the plain bearing is being used in initial and intermediate operation periods of an automobile. Meanwhile, during a final operation period, an intermetallic compound grows due to diffusion at the interface between the Sn-based overlay and a plain-bearing layer. In addition, when a plain bearing is stored at high temperature for a long period of time, an intermetallic compound is formed due to diffusion. A plain bearing according to the present invention can suppress growth of an intermetallic compound layer, even when the plain bearing is mounted in an automobile or is heat-treated in the course of its production. A feature of the plain bearing according to the present invention is therefore suppressed deterioration of compatibility. Furthermore, when the plain bearing is heat-treated in the course of its production, and is then mounted in an automobile, the once-formed intermetallic compound layer grows in a suppressed manner. The plain bearing according to the present invention, encompassing various embodiments of use described above, is characterized in that: an Sn-based overlay is deposited by electro-plating without an intermediary of an intermediate layer for diffusion prevention on a plain-bearing layer, which contains Sn and Ni in a total amount of more than 4 mass % to 20 mass % (the minimum amount of Sn is 4 mass %), and having a hardness of Hv 150 or less; and, an intermetallic compound layer is formed between the Sn-based overlay and copper alloy of the plain bearing (hereinafter referred to as "a plain bearing having a diffusion layer").

The final period mentioned above depends on performances of an automobile and the like but is estimated to be mileage of 150000 km or more. When this mileage is converted by reference to an average speed of 150 km/h, it corresponds to 1000 hours. The final operation conditions can be reproduced in a laboratory by a heat treatment for that time period at 150 degrees C., which is usual oil-temperature.

A preferable embodiment of the plain bearing having the diffusion layer according to the present invention comprises a Cu—Sn based intermetallic compound layer formed in the Sn-based overlay, and minute unevenness is formed at the interface between the Sn-based overlay and the Cu—Sn based intermetallic compound layer. More specifically, since the activity of Cu is low in the copper alloy for a plain bearing according to the present invention, the diffusion layer formed by heat treatment is relatively thin and the remaining Sn layer is kept thick. As a result, compatibility is improved. The surface of a diffusion layer formed by the heat treatment has a number of minute convexities.

Figure 1:
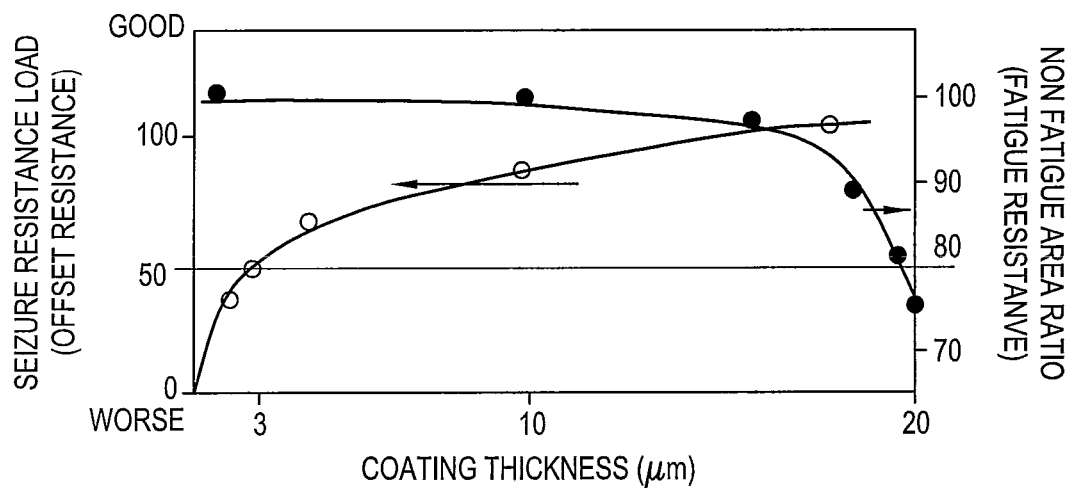
FIG. 1 A graph showing the relationship between the thickness of an Sn-based overlay and bearing performances; i.e., a seizure resistant load and fatigue resistance.
Figure 2:
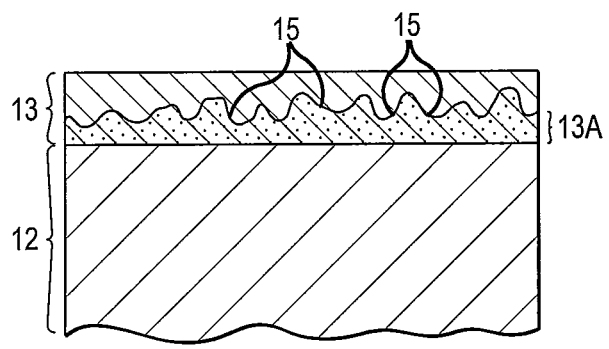
FIG. 2 A cross sectional drawing of a plain bearing illustrating an embodiment of the present invention.

A cross sectional structure of such bearing is illustrated in FIG. 2. In FIG. 2, a plain-bearing layer is denoted by reference numeral 12, an Sn-based overlay is denoted by 13, an intermetallic compound layer formed by diffusion is denoted by 13A, and minute convexities are denoted by 15. As is shown in the drawing, since Sn is embedded in the minute convexities 15, when the Sn-based overlay 13 is worn out to the level of minute convexities 15, an opposite shaft is brought into contact with the metallic Sn having improved compatibility and with the Cu—Sn based intermetallic compound having high hardness. Such contact seems to improve seizure resistance.

The conditions proposed in Patent Document 12; i.e., 180-200 degrees C. for 5-20 hours, can be employed for the heat treating conditions for diffusion. In most cases, the temperature to which a plain bearing is exposed during engine operation is lower than this temperature. It is therefore expected that the heat treatment mentioned above can suppress diffusion during engine operation.

Mutual diffusion occurs between a plain-bearing copper-alloy and an Sn-based overlay in the plain bearing having a diffusion layer according to the present invention. Total thickness of a remaining Sn-based overlay and a Cu—Sn based intermetallic compound layer is greater than the Sn plating thickness immediately after production. The remaining Sn-based overlay is thinner than that immediately after production. Performance of a thinned Sn-based overlay under offset contact is lowered as compared with that in a new automobile. However, performance of a certain level is expected so long as an Sn plating layer remains. Compatibility of the plain-bearing according to the present invention is impaired to a lesser extent as compared with a conventional plain bearing. However, generally speaking, the remaining Sn-based overlay is preferably 3 μm or more in thickness.

Figure 3:
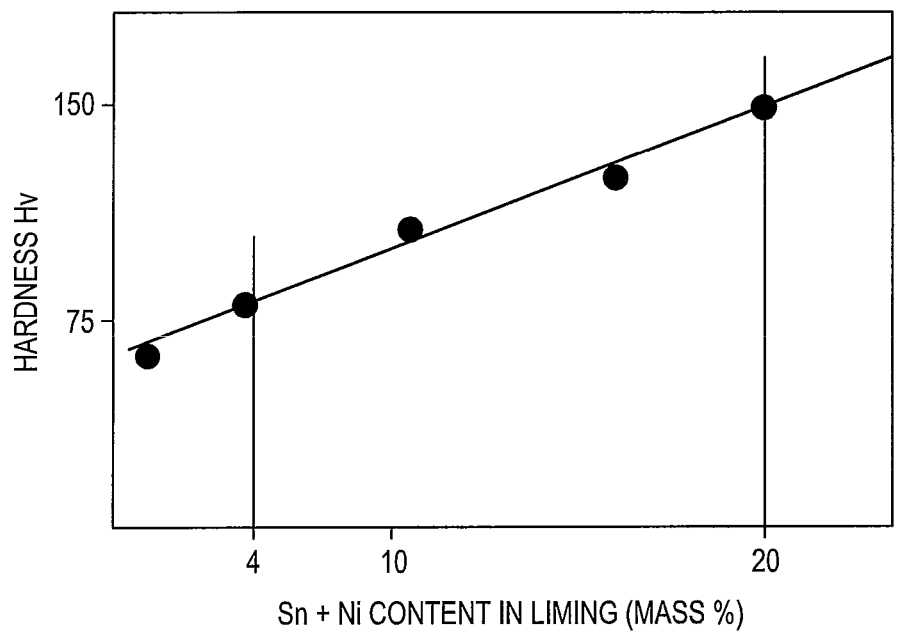
FIG. 3 A graph showing a relationship between total Sn+Ni content and hardness of a lining.
Figure 4:
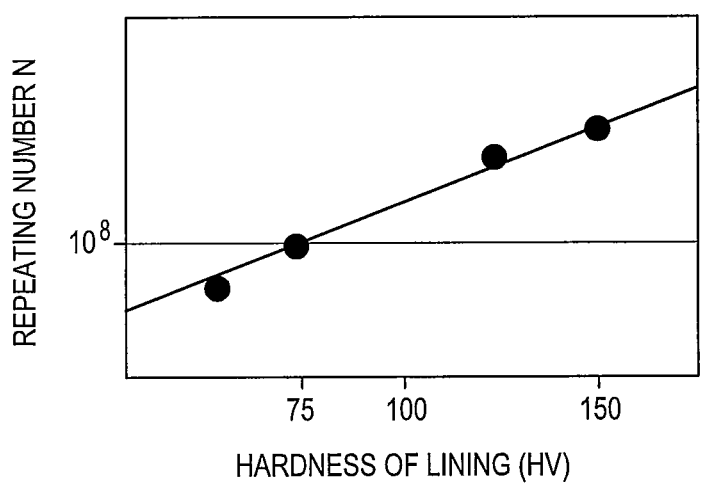
FIG. 4 A graph showing a relationship between the hardness of a lining and number of cycles until failure in a fatigue test.
Figure 5:
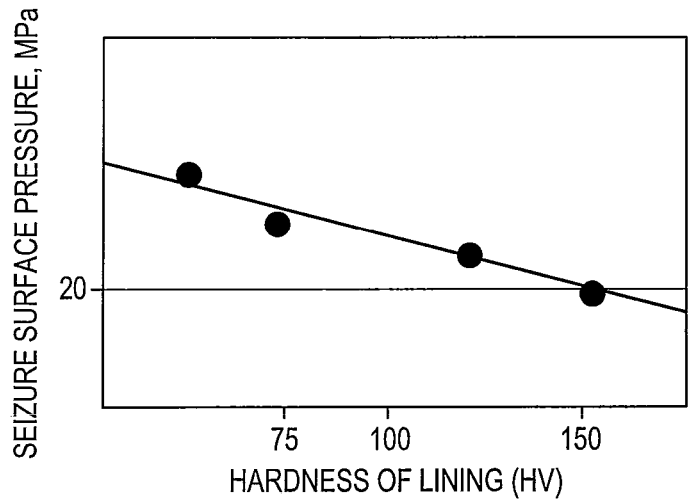
FIG. 5 A graph showing a relationship between hardness and seizure surface-pressure of a lining.

Hardening degree of a plain bearing according to the present invention can be quantitatively expressed by hardness. FIG. 3 shows a relationship between Sn+Ni content (equal Sn and Ni amounts) of copper alloy and hardness of the copper alloy, which is air-cooled after rolling. Also, FIG. 4 shows a relationship between hardness and fatigue strength of a plain bearing with an overlay, and FIG. 5 shows a relationship between hardness and seizure resistance of a plain-bearing with an overlay. The fatigue resistance and seizure resistance are measured by the methods described below. It is clear from these drawings that hardness of copper alloy is preferably Hv75 to 150. Now, the testing results of a plain bearing according to the present invention are described.

Figure 6:
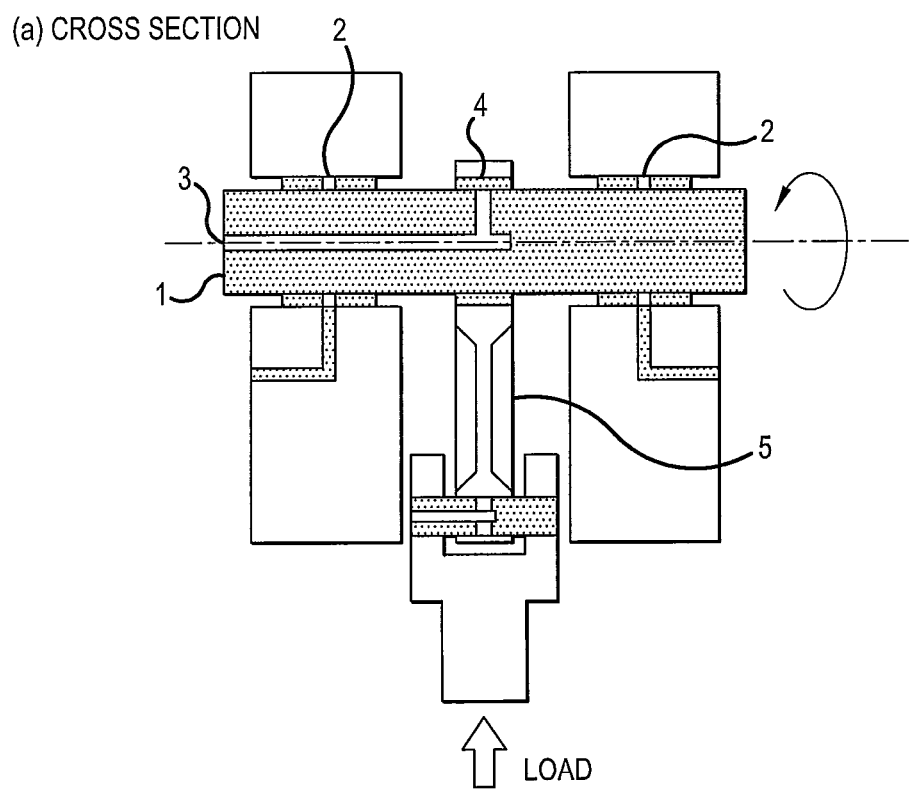
FIG. 6 A drawing of a seizure tester.

Method for Testing Fatigue Resistance
Tester: Reciprocating dynamic load tester
Sliding speed: 6.6 msec (3000 rpm)
Surface pressure on bearing: 57 MPa
Size of bearing: 42 mm in diameter×17 mm in width
Shaft: S55C (quenched)
Kind of lubricating oil: 10 W-30 CF4
Temperature of oil fed: 120 degrees C.
Testing time 50 h
Method for Testing Seizure Resistance
Surface pressure on a bearing: 3.6 MPa/30 min, step up
Testing time: until occurrence of seizure
Conditions other than those mentioned above are the same as those of the method for testing fatigue resistance FIGS. 6 and 7 show a seizure tester. In the drawings, a rotary shaft denoted by reference numeral 1 is supported by two supporting bearings 2 and is fitted with a test bearing 4 on a central outer peripheral portion. Oil is fed on the inner surface via a feeding groove denoted by 3. Load is applied to the test bearing 4 through a connecting rod 5. As is shown in detail in FIG. 7, the test bearing 4 is in contact with the rotary shaft 1 at an angle of 0.2°; that is, off set contact is realized.

As is clear from FIGS. 3 through 5, with increasing hardness of the lining, fatigue resistance is improved but seizure resistance is degraded. In every composition of the lining, hardness is Hv150 or less. When seizure occurred, the Sn-based overlay was locally worn out, and the lining was exposed.

A 10 μm thick Sn-based overlay was applied on the linings, which had various total Sn+Ni contents (with regard to a lining having 4.01 mass %, Sn=4 mass %, the balance of Ni; with regard to the other linings, Sn and Ni were of equal amounts). The thus-prepared specimens, as well as specimens that had been heat-treated at 150 degrees C. for 1000 hours, were subjected to the seizure-resistance test described above. The results are shown in FIG. 8. The heat-treating condition corresponds to the final operation period described above and leads to diffusion of Cu from the linings. A Cu—Sn based intermetallic compound is formed in the lining. Such change should be borne in mind in examining FIG. 8. The following facts are clear from FIG. 8.

(a) When the total Sn+Ni content is zero, pre-heating seizure resistance is improved but the seizure resistance is seriously degraded due to diffusion of Cu by heating.

(b) When the total Sn+Ni content is 25 mass %, post-heating seizure resistance is low.

(c) When the total Sn+Ni content is 4 to 20 mass %, the specimens exhibit improved seizure resistance both prior and subsequent to heating.

Figure 10:
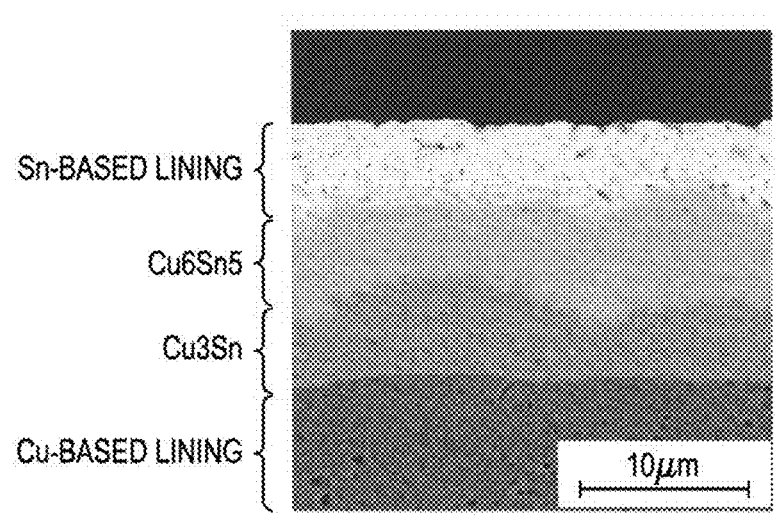
FIG. 10 A microscopic photograph of the entire plain-bearing according to a sample of Table 1. The plain-bearing comprises a lining with a total Sn+Ni content of 20% and an Sn overlay applied on the lining, and is heat treated.

A lining having a total Sn+Ni content of 20 mass % was subjected to heat treatment corresponding to engine-operating condition. The entire microscope photograph of a bearing obtained subsequently is shown in FIG. 10. Convexities present at the interface of an intermetallic compound layer and overlay are flattened by heat treatment according to claim 4.

Furthermore, a plain bearing according to the present invention is advantageous in stable improved performance for a prolonged usage time, because the intermetallic compound layer grows slowly in the Sn-based overlay. Specifically, although Cu of the lining and Sn inevitably diffuse into each other during use in an internal combustion engine, since Ni and Cu lower the activity of Cu in the lining, and since the Cu—Sn based intermetallic compound diffusion layer is formed by heat treatment during production, it is possible to suppress the Sn-based overlay from changing to intermetallic compound, and hence deterioration. FIG. 9 shows the test results for measuring thickness of a Cu—Sn intermetallic compound layer. In these tests, the Sn plating was 10 μm μm thick, and heat treatment was carried out at 150 degrees C. As is clear from FIG. 9, growth of an intermetallic compound layer can be suppressed in the lining as the Sn+Ni amount is increased.

Specifically, when the Sn+Ni content is zero, the remaining Sn disappears at heat treatment for 1000 hours. When the Sn+Ni content is 4.01 mass %, 3 μm thick Sn remains on the surface of an overlay, after heat treatment for 1000 hours. Growth speed may be considerably slow after 1000 hours. Performance in the final operating condition of a plain bearing according to the present invention is improved over the conventional bearing.

BEST MODE FOR CARRYING OUT INVENTION

Example 1

Composition of a lining is shown in Table 1. A 1.5 mm thick plain bearing was produced by conventional rolling and forming. Sheet material was subjected to electrolytic degreasing, water rinsing, pickling, and water rinsing. A 10 μm thick overlay was deposited on the sheet material by electro-plating. The conditions for electro-plating were as follows. Identical results were obtained.
Condition (a):
Stannous sulfate: 20-30 g/L (in terms of metallic Sn)

Inorganic ammonium salt: 50-150 g/L
Organic Carbonic acid: 10-40 g/L
Bath temperature: 30 degrees C.
Current density: 0.5 to 5 A/dm$^2$
Condition (b)
Sn fluoroborate: 10-20 g/L (in terms of Sn ions)
Fluoroboric acid: 100-500 g/L
Gelatin: 0.5-4 g/L
β naphthol: 0.1-2 g/L
Bath temperature: 30 degrees C.
Current density: 0.5-5 A/dm$^2$ All of the specimens were subjected to heating at 150 degrees C. for 1000 hours, thereby providing a final operating condition of an automobile. The test was then carried out. Table 1 shows the results of seizure resistance and hardness measurement (load of 500 g).

TABLE 1

| Classification | No | Composition (wt %) Lining | | | | Composition (wt %) Overlay | | Thickness (A) (μm) | Thickness (B) (μm) | Hardness Of Lining (Hv) | Seizure Resistance |
|---|---|---|---|---|---|---|---|---|---|---|---|
| | | Cu | Sn | Ni | Others | Sn | Others | | | | |
| Examples | 1 | Bal | 4 | 0.01 | — | 100 | — | 14 | 3 | 75 | 57 |
| | 2 | ↑ | 7 | 3 | — | ↑ | — | 12 | 4 | 105 | 68 |
| | 3 | ↑ | 17 | 3 | — | ↑ | — | 9 | 5.5 | 150 | 60 |
| | 4 | ↑ | 20 | 0 | — | ↑ | — | 10 | 5 | 145 | 57 |
| | 5 | ↑ | 4 | 3 | — | ↑ | — | 13 | 3.5 | 90 | 60 |
| | 6 | ↑ | 7 | 7 | — | ↑ | — | 11 | 4.5 | 125 | 57 |
| | 7 | ↑ | 7 | 3 | Al = 2 | ↑ | — | 11 | 4.5 | 120 | 60 |
| | 8 | ↑ | 7 | 3 | — | 99 | Ag = 1 | 12 | 4 | 105 | 57 |
| | 9 | ↑ | 7 | 3 | In = 2 | 100 | — | 11 | 4.5 | 110 | 64 |
| | 10 | ↑ | 7 | 3 | Zn = 2 | ↑ | — | 11 | 4.5 | 115 | 60 |
| | 11 | ↑ | 7 | 3 | Ag = 2 | ↑ | | 10 | 5 | 120 | 64 |
| | 12 | ↑ | 7 | 3 | — | 99 | Cu = 1 | 10 | 5 | 105 | 60 |
| | 13 | ↑ | 7 | 3 | — | 99 | Sb = 1 | 12 | 4 | 105 | 57 |
| | 14 | ↑ | 7 | 3 | — | 95 | Ag = 5 | 14 | 3 | 105 | 54 |
| Comparative Examples | 1 | 100 | — | — | — | 100 | — | 20 | 0 | 60 | 24 |
| | 2 | Bal | 20 | 4 | — | ↑ | — | 8 | 6 | 175 | 40 |
| | 3 | ↑ | 2 | — | — | ↑ | — | 20 | 0 | 70 | 20 |
| | 4 | ↑ | 30 | — | — | ↑ | — | 8 | 6 | 190 | 37 |
| | 5 | ↑ | 15 | 20 | — | ↑ | — | 7 | 6.5 | 200 | 24 |
| | 6 | ↑ | 7 | 3 | — | 90 | Ag = 10 | 17 | 1.5 | 105 | 40 |

Thickness (A): thickness of an intermetallic compound layer, corresponding to 100000 km
Thickness (B): thickness of an Sn layer, corresponding to 100000 km The comparative examples of Table 1 are of the following specifications.

Test specimens 1, 3: the intermetallic compound is thick and seizure resistance is poor Test specimens 2, 4, 5: total Ni+Sn content is so high that the lining is drastically hardened. Although growth of intermetallic compound is suppressed, seizure resistance is poor.

Test Specimen 6: an Sn-based overlay is deposited on the lining of Test Specimen 2 of Example. Since the Sn-based overlay has excessively high Ag content, seizure resistance is poor.

All of the performance characteristics of the test specimens according to the examples are improved over those of the comparative examples. It was ascertained by (EPMA) that neither Ni nor Sn concentrates at the interface with an overlay.

Example 2

With regard to examples Nos. 1, 2 and comparative examples Nos. 1, 3, the heat treatment was carried out at 200 degrees C. for 5 hours. Then, the seizure resistance test was carried out. The results are shown in Table 2.

TABLE 2

| Classification | Test Specimen No. | Seizure Resistance |
|---|---|---|
| Invention | 1: Cu—4Sn—0.01Ni | 72 MPa |
| | 2: Cu—7Sn—3Ni | 80 MPa |
| Comparative Example | 1: Cu | 24 MPa |
| | 2: Cu—2Sn | 20 MPa |

Seizure resistance of Test Specimens 1, 2 is further improved over that in Example 1. This indicates that a Cu—Sn diffusion layer having minute convexities effectively enhance seizure resistance. The Cu—Sn diffusion layer is 3 μm thick.

INDUSTRIAL APPLICABILITY

The advantages of a plain bearing according to the present invention are follows.
(a) Production cost is low, because an Ni barrier is not necessary.
(b) Since the lining is free of Pb or the like, environmental pollution is not incurred.
(c) Diffusion of Cu itself from a lining is suppressed. Therefore, a main target of designing an Sn-based overlay should not be prevention of diffusion, but to exhibit excellent compatibility of an Sn-based overlay. As a result, an Sn-based overlay having excellent compatibility can be combined with a lining in which Cu diffusion is suppressed. Sliding performances of sliding members, such as a plain bearing of an internal combustion engine, are improved to an outstanding extent.
(d) Since diffusion of Cu into an overlay during an automobile operation is suppressed, a compatibility performance of an overlay is maintained over a long period of time. Meanwhile, when an overlay is partly worn out, performances of the lining are excellent, because the lining exhibits improved seizure resistance.

The invention claimed is:

1. A plain bearing comprising:
a copper alloy plain-bearing layer consisting essentially of Sn and Ni in a total amount of more than 4 mass % to 20 mass %, the minimum amount of Sn being 4 mass %, the balance consisting of Cu and inevitable impurities, wherein the copper alloy plain-bearing layer has a hardness of Hv 150 or less, and
an Sn-based overlay having a thickness of 3 to 19 μm deposited by electro-plating without an intermediary of an intermediate layer for diffusion prevention on said copper alloy plain-bearing layer,
wherein said Sn-based overlay comprises a Cu—Sn intermetallic layer formed by diffusion between the Sn-based overlay and the copper alloy of the plain bearing.

2. The plain bearing according to claim 1, wherein said Sn-based overlay consists of pure Sn or an Sn alloy containing 5 mass % or less of at least one selected from the group consisting of Ag, Cu and Sb.

3. The plain bearing according to claim 1, wherein said Cu—Sn intermetallic compound layer has minute unevenness.

4. The plain bearing according to claim 2, wherein said Cu—Sn based intermetallic compound layer is formed by heat treatment at 180 to 200° C. for 5 to 20 hours, before mounting of the bearing.

5. The plain bearing according to claim 1, wherein the hardness of said copper alloy plain-bearing layer is Hv 75 or more.

6. The plain bearing according to claim 2, wherein the hardness of said copper alloy plain-bearing layer is Hv 75 or more.

7. The plain bearing according to claim 1, wherein said copper alloy plain-bearing layer further contains 5 mass % or less of one or more of Zn, Ag, Al and In.

8. The plain bearing according to claim 2, wherein said copper alloy plain-bearing layer further contains 5 mass % or less of one or more of Zn, Ag, Al and In.

9. The plain bearing according to claim 3, wherein said copper alloy plain-bearing layer further contains 5 mass % or less of one or more of Zn, Ag, Al and In.

10. The plain bearing according to claim 4, wherein said copper alloy plain-bearing layer further contains 5 mass % or less done or more of Zn, Ag, Al and In.

* * * * *

UNITED STATES PATENT AND TRADEMARK OFFICE
CERTIFICATE OF CORRECTION

PATENT NO. : 8,440,322 B2  Page 1 of 1
APPLICATION NO. : 12/530356
DATED : May 14, 2013
INVENTOR(S) : Shigeyuki Suga et al.

It is certified that error appears in the above-identified patent and that said Letters Patent is hereby corrected as shown below:

IN THE CLAIMS:

In claim 1, at column 11, lines 13-14, change "intermetallic layer" to --intermetallic compound layer--.

Signed and Sealed this
Twenty-eighth Day of January, 2014

Michelle K. Lee
*Deputy Director of the United States Patent and Trademark Office*